UNITED STATES PATENT OFFICE.

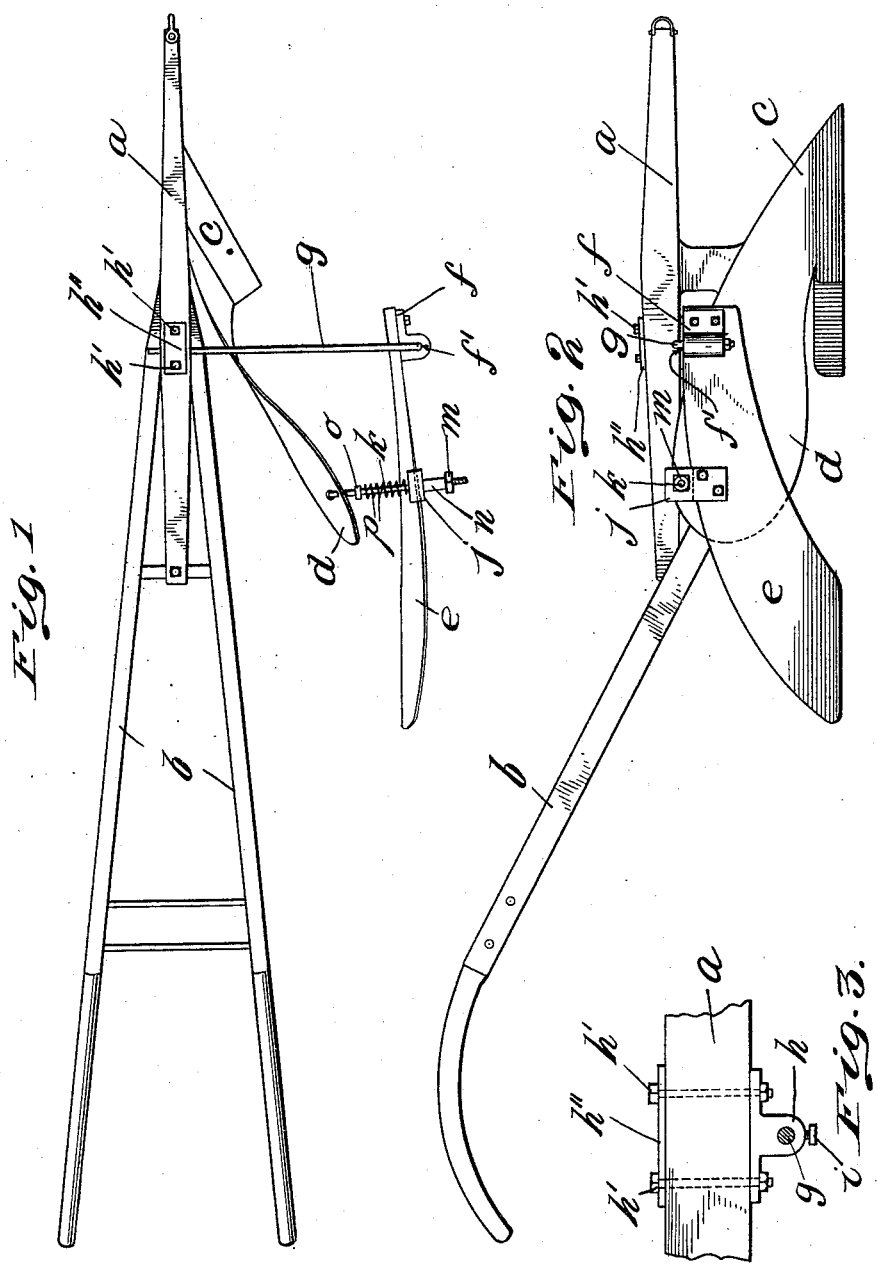

KNUT O. BERVEN, OF HODGES, MONTANA.

FURROW-GUIDE.

1,000,961. Specification of Letters Patent. Patented Aug. 15, 1911.

Application filed March 18, 1910, Serial No. 550,289. Renewed July 12, 1911. Serial No. 638,214.

*To all whom it may concern:*

Be it known that I, KNUT O. BERVEN, a citizen of the United States, residing at Hodges, in the county of Dawson, State of Montana, have invented a new and useful Improvement in Furrow-Guides, of which the following is a specification.

This invention relates to improvements in furrow guides for attachment to plows and like implements; and an object of this invention is to provide a furrow guide which will prevent the soil turned in the plowing of one furrow from overlapping the soil just turned in plowing the preceding furrow, whereby a smooth even surface is produced over the entire plowed field or area and the necessity of the customary crushing and rolling is avoided.

In the drawings illustrating the principle of this invention and the best mode now known to me of applying that principle, Figure 1 is a plan view of a plow equipped with my new furrow guide; Fig. 2 is a side elevation of what is shown in Fig. 1; and Fig. 3 is a fragmentary detail which illustrates the mounting of the inner end of the connecting rod.

The plow may be of any ordinary type and, as shown in the drawings, consists of the plowbeam $a$, the handles $b$, and the plowshare $c$ having a moldboard $d$. The front end of the guideboard $e$ is provided with a bracket $f$ bolted thereto and formed with a hole $f'$. In the latter is inserted one end of the bent connecting rod $g$ the other end of which is held in its adjusted position in the bracket $h$ by the screw-rod $i$. The bracket $h$ is fastened to the lower face of the plowbeam by the bolts $h'$, between the heads of which and the top of the plowbeam is interposed a washer plate $h''$. About the middle of the upper edge of the guideboard $e$ is fastened a bracket $j$ through a hole in which passes a rod $k$ one end of which is mounted in the moldboard $d$ and the other end of which is threaded to engage a nut $m$. Between the latter and the bracket $j$ is interposed a piece of pipe or sleeve $n$; and between the bracket $j$ and the collar $o$ there is interposed a coil spring $p$ mounted on the rod $k$. The spring $p$ tends to hold the guideboard $e$ away from the moldboard $d$.

It will be obvious that the guideboard may be adjusted with respect to the moldboard. Further, the spring $p$ permits the guideboard to yield on the rod $k$ and thereby prevents breakage of the parts. Manifestly the guideboard may turn on the bent end of the connecting-rod $g$ and may slide on the rod $k$.

I claim:

The combination with a plow having a plowshare formed with a moldboard; of a guideboard for preventing the overlapping of the turned soil; a rod which connects said guideboard and plow, said guideboard being pivotally mounted on said rod; a rod one end of which is mounted in said moldboard and on which is slidably mounted said guideboard; and a spring interposed on the last named rod between said moldboard and guideboard.

KNUT O. BERVEN.

Witnesses:
J. A. SLATTERY,
F. A. PARRETT.

Copies of this patent may be obtained for five cents each, by addressing the "Commissioner of Patents, Washington, D. C."